(12) United States Patent
Ryan et al.

(10) Patent No.: US 11,305,290 B2
(45) Date of Patent: Apr. 19, 2022

(54) LAMINATED, LOW-PROFILE, VIBRATION-DAMPED TABLE TOP

(71) Applicant: Technical Manufacturing Corporation, Peabody, MA (US)

(72) Inventors: Steven T. Ryan, Newburyport, MA (US); John E. Booth, Newbury, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 636 days.

(21) Appl. No.: 15/575,172

(22) PCT Filed: May 18, 2016

(86) PCT No.: PCT/US2016/033046
§ 371 (c)(1),
(2) Date: Nov. 17, 2017

(87) PCT Pub. No.: WO2016/187281
PCT Pub. Date: Nov. 24, 2016

(65) Prior Publication Data
US 2018/0141050 A1    May 24, 2018

Related U.S. Application Data

(60) Provisional application No. 62/163,622, filed on May 19, 2015.

(51) Int. Cl.
*B01L 9/00* (2006.01)
*B01L 9/02* (2006.01)
(Continued)

(52) U.S. Cl.
CPC .............. *B01L 9/02* (2013.01); *F16F 15/02* (2013.01); *B01L 2200/12* (2013.01); *B01L 2300/0887* (2013.01); *G01M 7/02* (2013.01)

(58) Field of Classification Search
CPC ............................ B01L 9/02; B01L 2300/12
(Continued)

(56) References Cited

U.S. PATENT DOCUMENTS

| 4,645,171 A * | 2/1987 | Heide .................. A47B 13/08 |
| | | 248/637 |
| 5,823,307 A | 10/1998 | Schubert et al. |
| 7,726,452 B2 | 6/2010 | Kraner |

FOREIGN PATENT DOCUMENTS

| GB | 2 175 199 A | 11/1986 |
| GB | 2 287 184 A | 9/1995 |

OTHER PUBLICATIONS

International Search Report and Written Opinion for International Application No. PCT/US2016/033046, dated Sep. 13, 2016.
(Continued)

*Primary Examiner* — Natalia Levkovich
(74) *Attorney, Agent, or Firm* — Smith Baluch LLP

(57) ABSTRACT

A low-profile, vibration-damped tabletop for supporting sensitive scientific equipment is described. The tabletop may include a laminated structure having a lower metal plate that is sized to achieve a desired weight for the tabletop, a manufactured, homogenous filler and a "clean top" metal upper skin having a plurality of holes backed by liquid impermeable barriers. The damping characteristics are improved at low frequencies compared to a comparable structure with a honeycomb filler.

37 Claims, 9 Drawing Sheets

(51) Int. Cl.
    *F16F 15/02*     (2006.01)
    *G01M 7/02*      (2006.01)
(58) Field of Classification Search
    USPC .................................................. 422/566, 560
    See application file for complete search history.

(56) References Cited

OTHER PUBLICATIONS

Ch. II International Preliminary Report on Patentability for International Application No. PCT/US2016/033046, dated Jun. 1, 2017.

* cited by examiner

LAMINATED, LOW-PROFILE, VIBRATION-DAMPED TABLE TOP

CROSS-REFERENCE TO RELATED APPLICATIONS

This application is a National Stage of International Patent Application No. PCT/US2016/033046, entitled "Laminated, Low-Profile, Vibration-Damped Tabletop" filed May 18, 2016, which claims priority to U.S. provisional application No. 62/163,622 titled, "Laminated, Low-Profile, Vibration-Damped Tabletop" filed on May 19, 2015, each of which is hereby incorporated by reference in its entirety.

BACKGROUND

Technical Field

The technology relates to vibration-damped, precision platforms for sensitive instruments such as microscopes and laboratory equipment. More particularly, the technology relates to a laminated, low-profile tabletop that may be used in such platforms.

Discussion of the Related Art

It has long been recognized that stable, preferably vibration-free, platforms are needed for various types of scientific research, development, and manufacturing, such as in the fields of optics, microfabrication, and microscopy. In the early $20^{th}$ century, laboratory tabletops were made of slabs of stone, and their sheer mass was relied upon for stability and suppressing any vibrations that may couple into the table. More recently, engineered platforms with passive or active vibration-damping systems have been developed and are available commercially for research and manufacturing purposes. Passively damped platforms may use an air suspension system to "float" the tabletop, and rely on viscous or other frictional forces to dampen or reduce any vibrations that might otherwise couple to the tabletop. Actively damped platforms may use motion sensors, actuators, and feedback control loops to sense and cancel vibrations that would otherwise couple to the tabletop. An example of a passively damped platform is described in U.S. Pat. No. 4,360,184, which is incorporated herein by reference. Examples of actively damped platforms are described in U.S. Pat. No. 5,660,255 and U.S. Pat. No. 8,899,393, both of which are incorporated herein by reference.

These engineered platforms include engineered tabletops. A conventional engineered tabletop 100 is depicted in FIG. 1A, and comprises a top skin 110 that is normally made of stainless steel. The top skin 110 may include an array of threaded holes 115 that are used to fasten scientific equipment securely to the tabletop. The threaded holes may be backed with cups 120 that help keep the tabletop clean (e.g., they prevent spilled liquid or other contaminants from entering into the tabletop structure where it cannot be removed). Further details of cups and "clean top" structures are described in U.S. Pat. No. 4,645,171 and U.S. Pat. No. 5,558,920, which are both incorporated herein by reference. An engineered tabletop 100 may further include a honeycomb filler 140 and lower skin 150 that is also made of steel or stainless steel.

The honeycomb filler 140 typically comprises a webbing of thin steel walls with large voids between the walls, as depicted in FIG. 1B. The honeycomb filler is an engineered product that provides considerable stiffness to the tabletop, and accommodates the cups 120. For example, threaded holes 115 with cups 120 may be located on a regular grid pattern (e.g., on one-inch spacings) indicated by the crosses 112 in FIG. 1B.

SUMMARY

The inventors have conceived and developed a low-profile, vibration-damped tabletop that can outperform conventional honeycomb tabletop structures. The tabletop can be manufactured more easily and at lower cost than a honeycomb-based tabletop structure. A manufactured homogeneous material (e.g., a fiberboard) may be used to fill the tabletop and provide stiffness to the structure. The homogeneous material allows for an increased thickness of a base plate of the tabletop, which can present problems for tabletop manufactured with a honeycomb filler. The increased thickness of the base plate allows the tabletop to meet a preferred weight range for different tabletop sizes while maintaining an overall low profile of the tabletop, which are important aspects for both vibration control and ergonomic reasons.

Some embodiments relate to a laminated, low-profile, vibration-damping tabletop comprising a top metallic skin perforated with a plurality of holes, a plurality of cups backing the plurality of holes and sealed to the top metallic skin, and a first homogeneous filling material bonded to the top metallic skin. The first homogeneous filling material may include manufactured voids to accommodate the plurality of cups. The tabletop may also include a base metallic plate connected to the first homogeneous filling material.

Some embodiments relate methods for manufacturing a vibration-damped tabletop. A method may comprise acts of forming a plurality of holes in a first metallic skin, bonding a plurality of cups to the first metallic skin to back the plurality of holes, forming a plurality of voids in a first homogeneous material, wherein a spacing of the plurality of voids matches a spacing of the plurality of holes, connecting the first homogeneous material to the first metallic skin, and connecting a metallic plate to the first homogeneous material.

In some embodiments, a method for manufacturing a vibration-damped tabletop may include acts of forming a plurality of holes in a first metallic skin, forming a plurality of voids in a first homogeneous material, wherein a spacing of the plurality of voids matches a spacing of the plurality of holes, inserting a plurality of cups into the plurality of voids, connecting the first homogeneous material to the first metallic skin, so that the cups seal to the first metallic skin and back the plurality of holes, and connecting a metallic plate to the first homogeneous material.

The foregoing apparatus and method embodiments may be included in any suitable combination with aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the embodiments may be shown exaggerated or enlarged to facilitate an understanding of the embodiments. The drawings are not necessarily to scale, emphasis instead being placed upon illustrating the principles of the teachings. In the drawings, like reference characters generally refer to like features, functionally similar and/or structurally similar elements throughout the various figures.

When referring to the drawings in the following detailed description, spatial references "top," "bottom," "upper," "lower," "vertical," "horizontal," and the like may be used. Such references are used for teaching purposes, and are not intended as absolute references for embodied devices. An embodied device may be oriented spatially in any suitable manner that may be different from the orientations shown in the drawings. The drawings are not intended to limit the scope of the present teachings in any way.

DETAILED DESCRIPTION

Figure 1A:
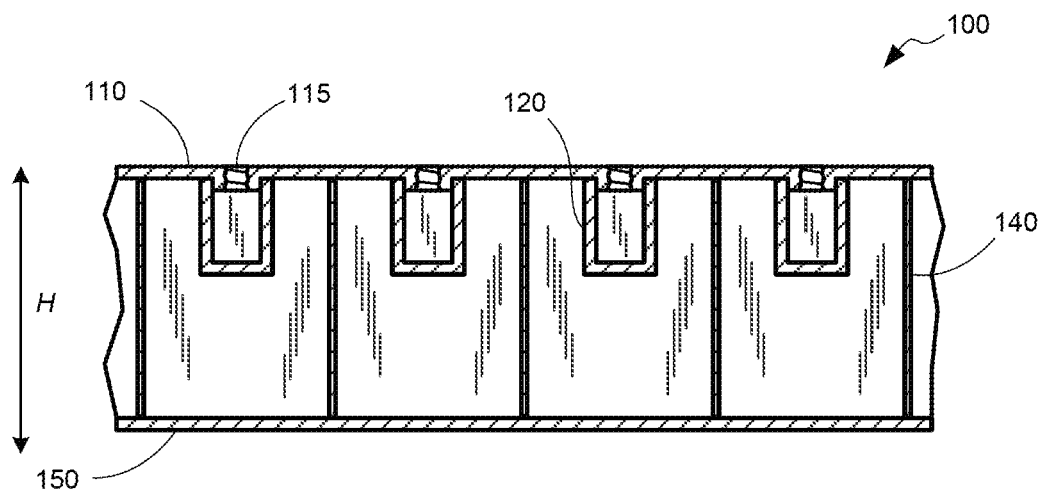
FIG. 1A depicts a honeycomb tabletop structure.
Figure 1B:
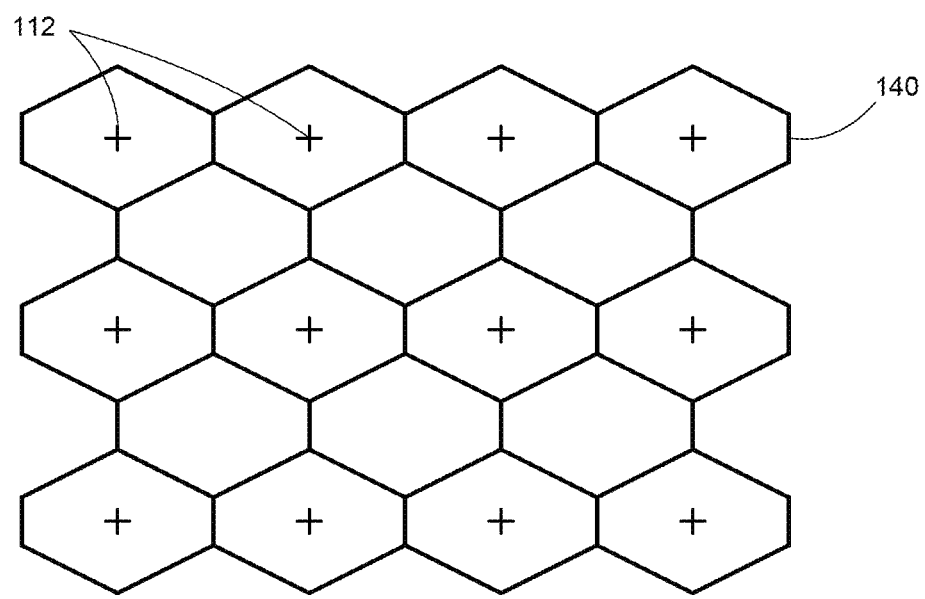
FIG. 1B depicts a honeycomb filler.

The inventors have recognized and appreciated that conventional tabletop structures, such as that depicted in FIG. 1A may not be best suited for certain scientific applications. For example, some applications require a sensitive scientific instrument (e.g., a high-resolution microscope) to be supported by a vibration-damped table, and the instrument needs to be easily accessed and operated by a user. The user may wish to sit in a chair at the table, with knees under the table, to operate the instrument. For such applications, it is preferable that a thickness of the tabletop be not greater than about 2 inches, so that the user can easily sit at the table and operate the instrument without hitting the underside of the tabletop with his legs. Although the tabletop structure depicted in FIG. 1A can be reduced and thickness to about 2 inches, this reduces the weight of the tabletop.

Figure 1C:
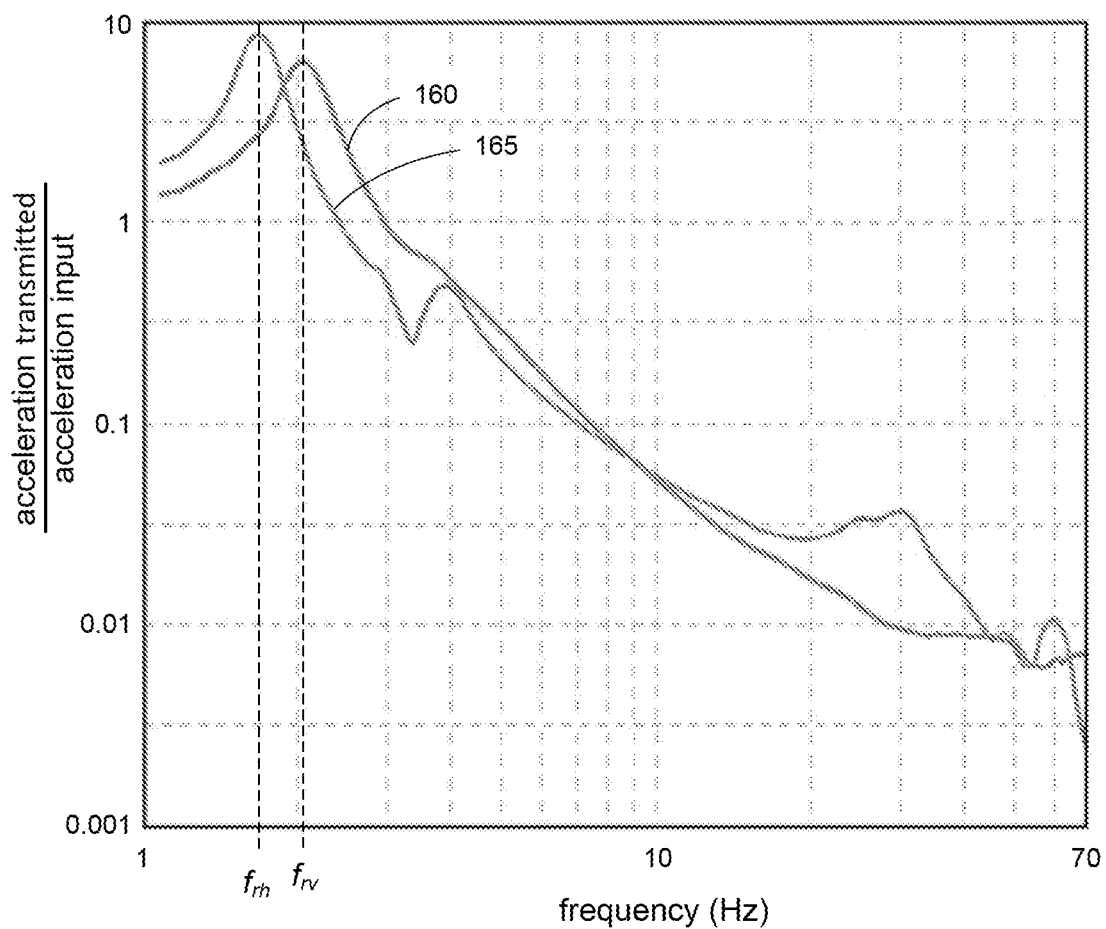
FIG. 1C depicts transmissibility of a vibration-isolated tabletop.

The inventors have recognized and appreciated that it is desirable to maintain a certain weight of the tabletop for vibration-isolation purposes. For many applications, the tabletop may be supported by a passively-damped, vibration-isolation platform, such as the one depicted in FIG. 5. For such a platform, there may be multiple vibration-isolation supports 530 distributed at different locations underneath the tabletop. The inventors have found that it is desirable for such applications to have the weight of the tabletop to be approximately 200 pounds or greater (e.g., more than 50 pounds per vibration-isolation support), so that air isolation and damping occurs at lower vibration frequencies (e.g., in the 2 to 10 Hz frequency region). This can be understood with reference to FIG. 1C, which depicts transmissibility of a vibration-isolated tabletop as a function of frequency. The response curves 160, 165 depict natural resonance frequencies $f_{rv}$, $f_{rh}$ of a vibration-isolated table measured in vertical (normal to the tabletop) and horizontal directions. At the resonance frequency, vibrations from external sources can be amplified by the vibration-isolation system in some cases. Beyond the resonance frequency, vibrations become attenuated so that the tabletop motion can be considerably less than motion of the surrounding environment (e.g., vibrations of a floor). If the load on each vibration-isolation support becomes less than approximately 50 pounds, or appreciably less than 50 pounds, the natural resonance frequency moves out to higher frequencies, so that vibration isolation may not occur in the 2 Hz to 10 Hz region. In some cases, it may be acceptable to have a weight loading as low as 35 pounds on each vibration-isolation support. To achieve such weight loadings with the structure of FIG. 1A, a thickness T of a conventional tabletop may increase to four inches or more as the size of the table becomes smaller, which is ergonomically unfavorable.

Since increasing the thickness of the tabletop structure 100 of FIG. 1A is unfavorable, one option is to increase a thickness of one or both of the top skin 110 and bottom skin 150. The inventors have found that increasing the thickness of the top skin 110 to a value more than approximately 0.187 inches leads to manufacturing problems. For example tapping a plurality of holes 115 in such a thick layer of metal can rapidly age and/or damage the equipment used to form and tap the holes. An additional problem can also arise when a thickness of the top skin and/or bottom skin 150 is increased to reach a desired weight. As the thickness of a skin is increased, the flexibility of the skin reduces. Typically the honeycomb core 140 and the bottom skin 150 are not perfectly flat. When the honeycomb core and bottom skin are bonded under pressure and are not perfectly flat, one or both of the components become adhered under stress. This stress can later lead to a delamination of the two components after being placed in service. Such delamination can unacceptably degrade the vibration-damping properties of the tabletop structure 100.

Figure 2A:
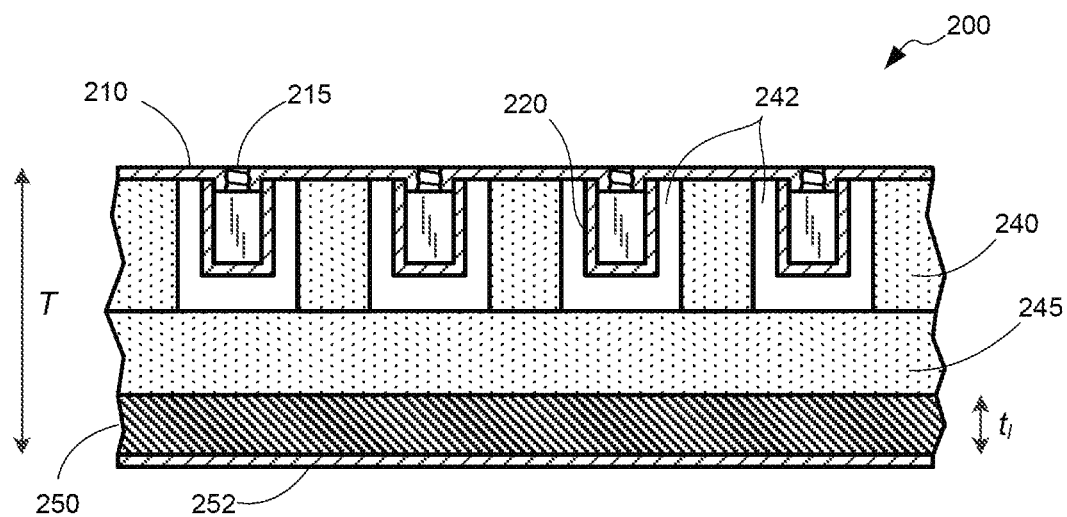
FIG. 2A depicts a low-profile, vibration-damped tabletop, according to some embodiments.

The inventors have conceived, developed, and tested a new low-profile, laminated tabletop 200, a portion of which is depicted in cross section in FIG. 2A. The tabletop structure may comprise a top skin 210 that is perforated with a plurality of holes 215. The holes may be threaded, according to some embodiments. A plurality of cups 220 may be sealed to the top skin 210 to back the holes 215. A manufactured homogeneous material 240 may be bonded to the top skin. The manufactured homogeneous material 240 may include a plurality of voids 242 that accommodate the cups 220 within the interior of the tabletop 200. In some embodiments, there may be a plurality of cups 220 formed in a sheet that is bonded to the top skin 210 to back the plurality of holes 215. The cups 220 may be sealed to the top skin 210 to prevent liquid or other contaminants from reaching the interior regions of the tabletop structure 200. According to some embodiments, there may be a second homogeneous material 245 that is bonded to the first homogeneous material 240. In some implementations, there may not be a second homogeneous material 245. The tabletop may further comprise a base metallic plate 250 (also referred to as base plate) that may be bonded to the laminated structure. In some implementations, there may be a bottom skin 252 that is bonded to the base plate, though other embodiments may not include a bottom skin. The resulting structure forms a laminated, low-profile, vibration-damped tabletop. An overall thickness T of the tabletop 200 may be between approximately 1.5 inches and approximately 2.5 inches, according to some embodiments.

The base plate 250 may be made of any metal or metal alloy, and may be steel or stainless steel. In some embodiments, a thickness $t_l$ of the base plate 250 can be selected, depending on the size of the tabletop, so that the weight of the tabletop is at least 150 pounds in some embodiments, or may be at least 200 pounds in some embodiments for any areal size between approximately 1.5 feet by 1.5 feet and approximately 4 feet by 5 feet while the thickness of the tabletop is between 1.5 and 2.5 inches. In some implementations, a thickness $t_l$ of the base plate 250 can be selected to provide a weight loading on each vibration-isolation support for the tabletop that is at least 35 pounds in some embodiments, or at least 50 pounds in some embodiments, for any areal size of the tabletop between approximately 1.5 feet by 1.5 feet and approximately 4 feet by 5 feet while the thickness of the tabletop is between 1.5 and 2.5 inches. As an example, the base plate 250 may be thicker for a tabletop measuring 2 feet by 3 feet than for a tabletop measuring 3 feet by 4 feet. The thickness of the base plate 250 may be between approximately 0.125 inch and approximately 2 inches, depending on an areal size of the tabletop and a number of vibration-isolation supports used to support the tabletop.

The inventors have recognized and appreciated that there are several desirable features of the low-profile, laminated structure over the honeycomb tabletop 100 depicted in FIG. 1A. The low-profile, laminated tabletop 200 can achieve a desired weight for virtually any tabletop size while maintaining an overall thickness (for ergonomic reasons) between approximately 1.5 inches and approximately 2.5 inches. The increased weight is beneficial for achieving vibration-isolation at low frequencies (e.g., within the 2 Hz to 10 Hz range), as described above in connection with FIG. 1C.

Referring again to FIG. 2A, the top skin 210 may comprise a metal (e.g., stainless steel), according to some embodiments. The thickness of the top skin may be between approximately 0.048 inches and approximately 0.25 inches. According to some embodiments, the plurality of holes 215 in the top skin 210 may be formed using any suitable manufacturing process and tapped to thread the holes. In some embodiments, the plurality of holes 215 may be formed by an extrusion process that extrudes a region of the top skin around each hole to increase the effective thickness of the top skin at the hole. The extruded hole may then be tapped to thread the extruded portion. The holes may be spaced on a regular array in some embodiments. In other embodiments, there may be few holes formed in the top skin and located for custom mounting of equipment. In this regard, there may be additional holes in the side walls 212, bottom skin 252, and/or base plate 250 for custom mounting of equipment.

The cups 220 may be formed of any suitable material that resists corrosion. In some embodiments, the cups may be formed from a metal, such as stainless steel, though other corrosion resistant metals may be used in some cases. In some implementations, the cups 220 may be formed from a polymer, such as a polyethylene or nylon. In some cases, there may be a mix of metal and polymeric cups. In some implementations, the cups may comprise a metal coated with a polymer. The cups 220 may be bonded to the top skin 210 with an adhesive. To reduce the amount of liquid entering a hole from a spill, a volume of the cups may be less than approximately 12 cubic centimeters, for example.

The first homogeneous material 240 may be any suitable material that is amenable to manufacturing processes, such as drilling, routing, and/or milling, molding, or forming in place. In some embodiments, the first homogeneous material may comprise a fiber board, such as a medium density fiberboard (MDF). In some implementations, the first homogeneous material may comprise a polymeric board, such as a PVC board. A polymeric board may be either a solid polymer board or a formed polymer board having voids or other formed lattice structures. Other materials that may be used for the first homogeneous material 240 include, but are not limited to, wood (e.g., solid wood, plywood, laminated wood), fiberglass, cast resin, and metal foam.

The second homogeneous material 245 may be any suitable material, and may have a flexibility that is greater than a flexibility of the base plate 250. The second homogeneous material may be made of a material that is the same as or different than the first homogeneous material 240. The second homogeneous material may be any one of the materials described above for the first homogeneous material 240. The second homogeneous material may be thicker than the first homogeneous material in some embodiments, or may be the same thickness or thinner than the first homogeneous material. Although some embodiments may comprise a single homogeneous material that serves the purposes of the first homogeneous material 240 and second homogeneous material 245, it can be advantageous to have separate layers for these components. For example, the first homogeneous material 240 may have a standard thickness so that it can be used for any tabletop size. The thickness of the second homogeneous material 245 can then be selected to accommodate different thicknesses of the base plate 250 while maintaining an overall tabletop thickness between 1.5 and 2.5 inches.

The bottom skin 252 may be formed from any suitable metal or alloy, such as steel or stainless steel, though other metals may be used in some embodiments. In some implementations, the bottom skin may comprise a polymer, epoxy, fiberglass, or other non-metallic coating. A bottom skin can provide corrosion protection for the base plate 250. In various embodiments, the bottom skin 252 may have a thickness between approximately 0.040 inch and approximately 0.080 inch, though larger or smaller thicknesses may be used in some cases. There may be one or more threaded holes (not shown) in the base plate 250 and bottom skin 252 and/or side walls 212 that may be used to fasten components or supporting structure to the tabletop 200.

Figure 2B:
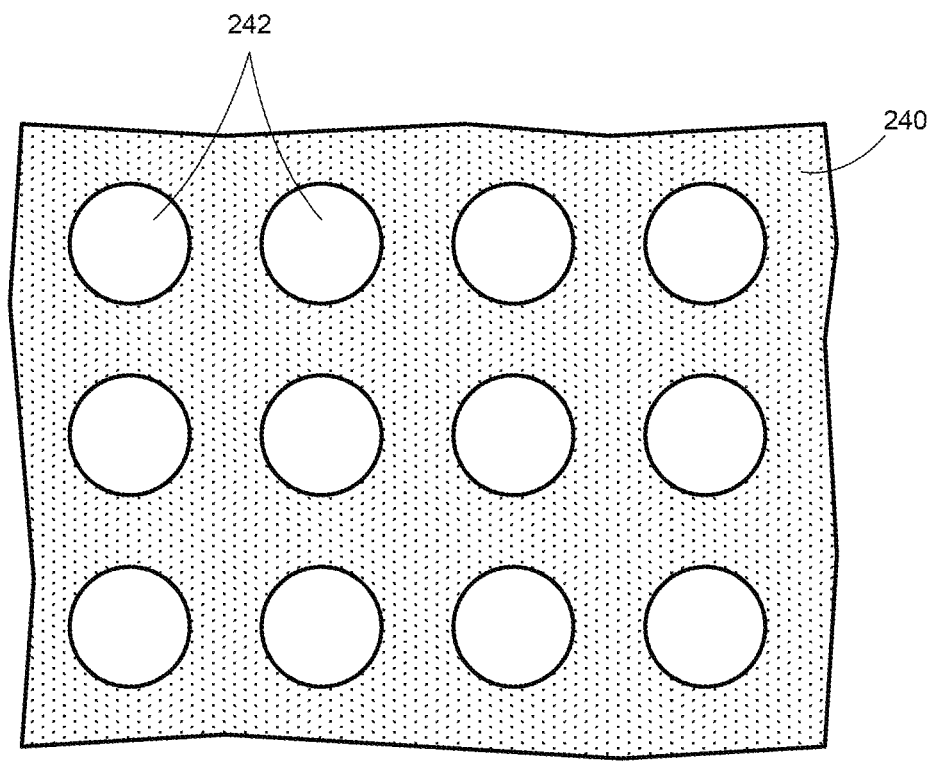
FIG. 2B depicts a manufactured homogeneous filler, according to some embodiments.

A plan view of a portion of the first homogeneous material 240 is depicted in FIG. 2B, according to some embodiments. A plurality of voids 242 may be formed in a regular, or irregular, pattern across the material. A center-to-center spacing of the voids 242 may match a center-to-center spacing or hole pattern of the plurality of holes 215 in the top skin 210, so that the voids 242 accommodate the cups extending below the top skin. The term "match" is used to mean that the center-to-center spacing of the voids 242 and holes 215 may be the same or approximately the same. Because the cups 220 are larger than the holes 215 and the voids 242 are larger than the cups, a reasonable amount of misalignment between holes, cups, and voids can be tolerated. The shape of the voids 242 may be any suitable shape (e.g., circles, squares, polygons, ellipses). According to some embodiments, the voids 242 may extend completely through, or partly through, the homogeneous material 240.

In some embodiments, the volume occupied or filled by the first homogeneous material 240 is more than one-quarter of the volume spanned by the first homogeneous material. The volume spanned by the first homogeneous material is given by its overall length, width, and height for a rectangular-shaped layer. The volume spanned by the first homogeneous material is nominally equal to the volume occupied by the first homogenous material plus the volume of the voids 242. In some cases, the volume occupied by the first homogeneous material is more than one-half of the volume spanned by the first homogeneous material.

Figure 3A:
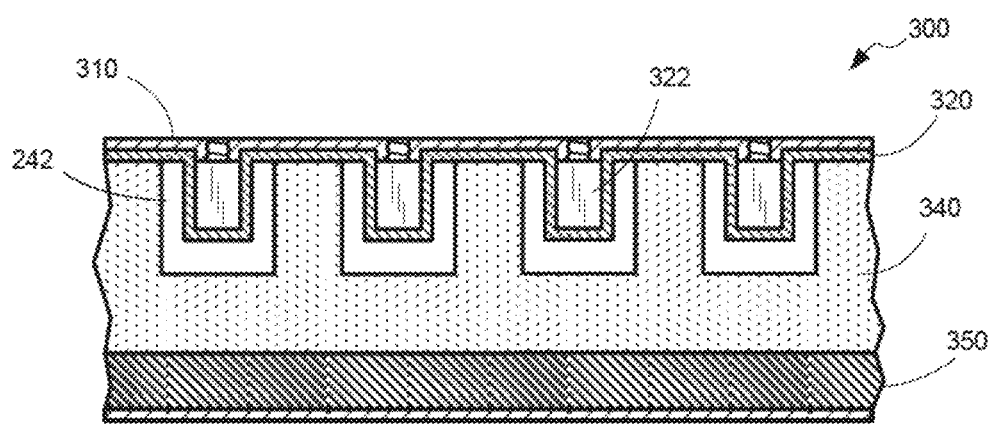
FIG. 3A depicts a low-profile, vibration-damped tabletop, according to some embodiments.

FIG. 3A depicts an alternate embodiment of a low-profile, vibration-damped tabletop 300. According to some embodiments, a single homogeneous material 340 may extend between the top skin 310 and the base plate 350. Instead of individual cups 220, a preformed sheet 320 having cups 322 formed therein may be adhered to the top skin 310. The preformed sheet may be formed from any suitable material, such as a metal or a polymer. The homogeneous material 340 may be adhered to the continuous preformed sheet 320. According to some embodiments, a plurality of voids 242 may be formed as blind holes manufactured into the homogeneous material 340. In some embodiments, the voids 242 may extend through the homogeneous material 340.

Figure 3B:
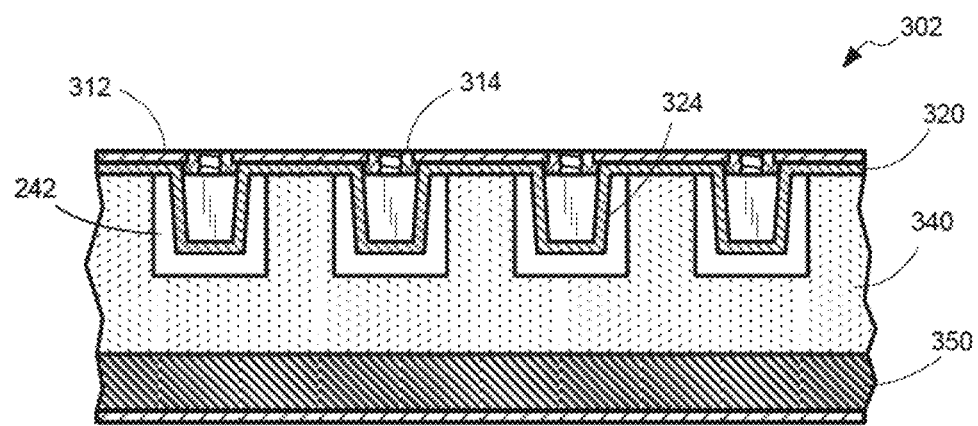
FIG. 3B depicts a low-profile, vibration-damped tabletop, according to some embodiments.

FIG. 3B depicts an alternate embodiment of a low-profile, vibration-damped tabletop 302. In this embodiment, sidewalls 324 of the cups formed in the sheet 320 are sloped rather than vertical. According to some embodiments, a threaded insert 314 may be joined to the holes formed in the top skin 312. The insert may be thicker than the top skin and provide more fastening strength, when threaded, than a threaded hole in the top skin.

Figure 3C:
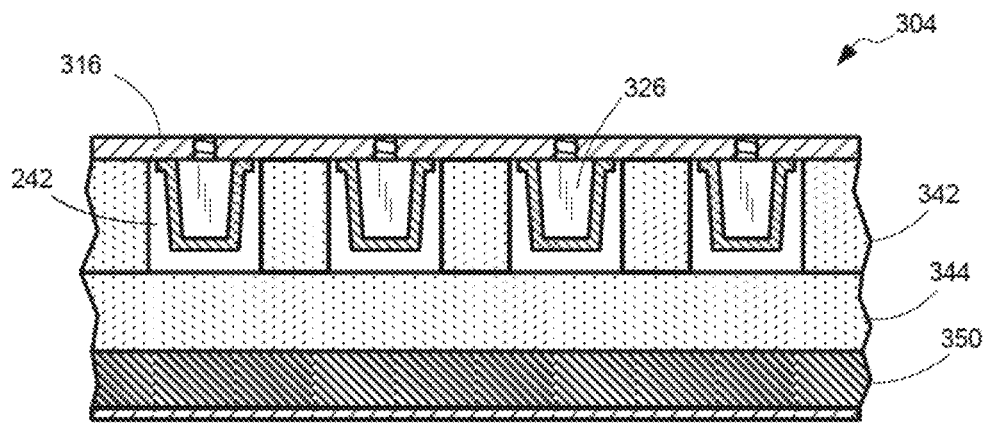
FIG. 3C depicts a low-profile, vibration-damped tabletop, according to some embodiments.

FIG. 3C depicts an alternate embodiment of a low-profile, vibration-damped tabletop 304. For this embodiment, the top skin 316 comprises an array of drilled and threaded holes 315. A plurality of cups 326 may be bonded to the top skin. The tabletop structure may comprise a first manufactured homogeneous layer 342 and a second homogeneous material 344.

Figure 3D:
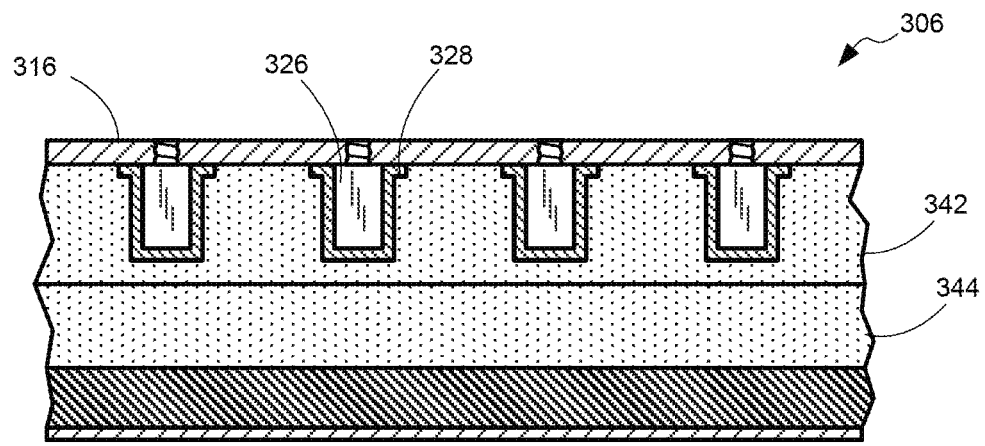
FIG. 3D depicts a low-profile, vibration-damped tabletop, according to some embodiments.

In some embodiments, the cups 326 may fit securely into the voids of the first homogeneous material, as depicted in FIG. 3D. The cups may, or may not, include flanges 328. If the cups include flanges (e.g., to improve adhesion and sealing of the cup to the top skin), the first homogeneous material 342 may be counterbored to accommodate the flange. An advantage of this structure is that the cups may be backed with solid material, so that they are less likely to detach or break seal with the top skin if a screw of excess length reaches the bottom of a cup while being tightened by a user. The stiff resistance can indicate the need for a shorter screw. When manufacturing a tabletop 306 according to the structure depicted in FIG. 3D, the cups may be inserted into the first homogeneous material, and then the cups and first homogeneous material may be bonded to the top skin in a same step.

Figure 3E:
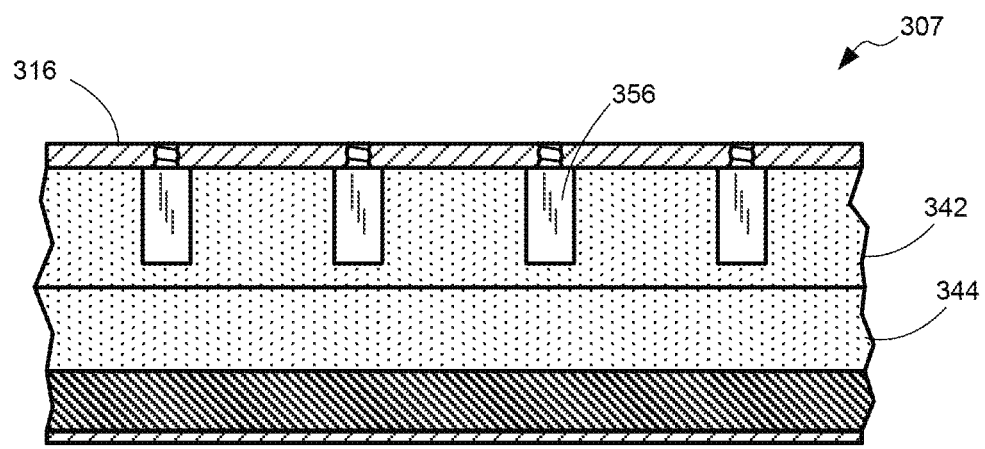
FIG. 3E depicts a low-profile, vibration-damped tabletop, according to some embodiments.

FIG. 3E depicts an alternate embodiment of a low-profile, vibration-damped tabletop 307. For this embodiment, the first homogeneous material may be manufactured to include a plurality of blind holes 356 that function as cups. In some implementations, the first homogeneous material may comprise a polymer in which the blind holes are formed. The polymer may be a sealed-cell polymeric board, so that liquids cannot permeate throughout the material. In some implementations, the first homogeneous material may comprise a fiberboard or other material to which a sealant (e.g., a polymer or epoxy sealant) is applied to the blind holes to prevent permeation of liquid into the material.

In some embodiments, cups 220 may be formed integrally in the first homogenous material 342 by a casting, molding, or form-in-place process. For example, the first homogeneous material and cups may be formed at a same time during a resin casting, fiberglass, molding, or form-in-place process. In some cases, the resulting material may have a three-dimensional, solid or closed-cell porous structure with cups integrally formed therein. In some cases, the resulting material may have a three-dimensional, lattice structure with cups integrally formed therein.

The various features and aspects of the vibration-damped tabletop structures depicted in FIG. 2A through FIG. 3E may be interchanged in some embodiments. For example, a top skin with extruded holes may be used in any of the illustrated embodiments, or any one of the cup designs may be used in any of the illustrated embodiments. Other combinations of features may be implemented.

There are several beneficial aspects of the laminated, low-profile tabletop. The added weight is at the base of the tabletop, which lowers the center of mass of the combined tabletop and equipment attached to the tabletop. A lowered center of mass improves vibration isolation for the equipment. The increased mass of the low-profile, laminated tabletop 200 compared to a similarly sized honeycomb tabletop 100 makes the low-profile tabletop more resistant to external perturbations due to its increased inertial mass. Additionally, a more massive tabletop reduces the relative mass of the payload to the tabletop. This can reduce the effect of disturbances from the payload on the overall isolated mass of the tabletop and payload (e.g., when the tabletop is supported by air isolation. A further benefit of the low-profile, laminated tabletop 200 relates to manufacturing. During the lamination process, one or more adhesives may be used to bond the layers together. Even though the base plate 250 and an adjacent layer of homogeneous material may not be perfectly flat, they both present a large surface area to the adhesive when pressed together. As a result, the adhesive may reflow to fill any voids or gaps when the laminated structure is pressed, so that the adjacent pieces can bond more uniformly across their surfaces and exhibit less or no preloaded stress when bonded. Further, there are larger surface areas for bonding the homogeneous material compared to a honeycomb structure. For the honeycomb structure, adhesive reflow may not happen due to the thin walls and large voids between the walls. Accordingly, the bonded tabletop 200 of FIG. 2A may not have gaps between laminated layers, which could degrade performance and may lead to delamination over its service lifetime. An additional benefit is that the homogeneous material can be of much lower cost than the engineered honeycomb structure. Further, the homogeneous filling material (such as MDF or a polymeric board) can be of appreciably lower cost than a steel honeycomb structure. Also, the filling material can be considerably easier to work in a manufacturing setting than a steel honeycomb structure. The filling material can have greater flexibility than the steel honeycomb structure, which can improve lamination of the tabletop in some cases. Additionally, performance results, shown in FIG. 4A, indicate that the laminated tabletop structure exhibits higher stiffness and better damping performance than a same-size honeycomb tabletop.

The inventors have made and tested a vibration-damped tabletop according to the structure shown in FIG. 2A. The overall thickness T of the tabletop was approximately 2 inches, and the lateral size of the tabletop was approximately 35 inches by 47 inches. A medium density fiberboard was used for the first homogeneous material 240 and for the second homogeneous material 245. A thickness of the top skin 210 was approximately 0.075 inches. The thickness of the base plate 250 was approximately 0.179 inches, and a thickness of the bottom skin 252 was 0.048. The total weight of the tabletop was 216 pounds. Results of a vibration-damping test, also known as a compliance test, for this tabletop are shown in FIG. 4A.

The compliance test comprises applying a mechanical perturbation (a measured force impulse) to the tabletop near its center and measuring with an accelerometer a deflection of the tabletop within about an inch from the point of impact of the impulse. The tabletop is supported with four supports near its four outer corners. Fourier analysis of the accelerometer data is used to determine the magnitude of the deflection at the tabletop center as a function of frequency. The compliance test is representative of how the tabletop would respond to perturbations acting on the tabletop, e.g., perturbations from equipment mounted on the tabletop. The results are depicted in FIG. 4A. The measured response shows a response of less than 500 microinch per pound-foot at 10 Hz, which falls off steeply. The results also show a first resonance peak at approximately 170 Hz having a peak value of approximately 80 microinch per pound-foot.

Figure 4A:
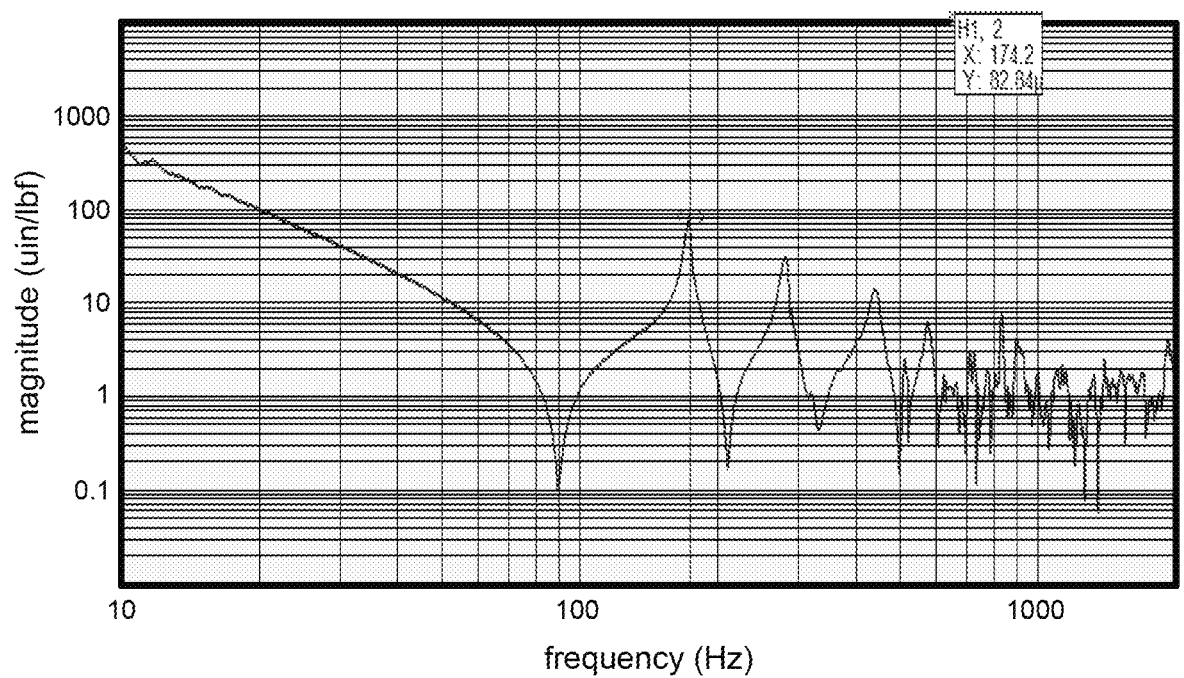
FIG. 4A illustrates vibration-damping performance of a low-profile, vibration-damped tabletop, according to some embodiments.
Figure 4B:
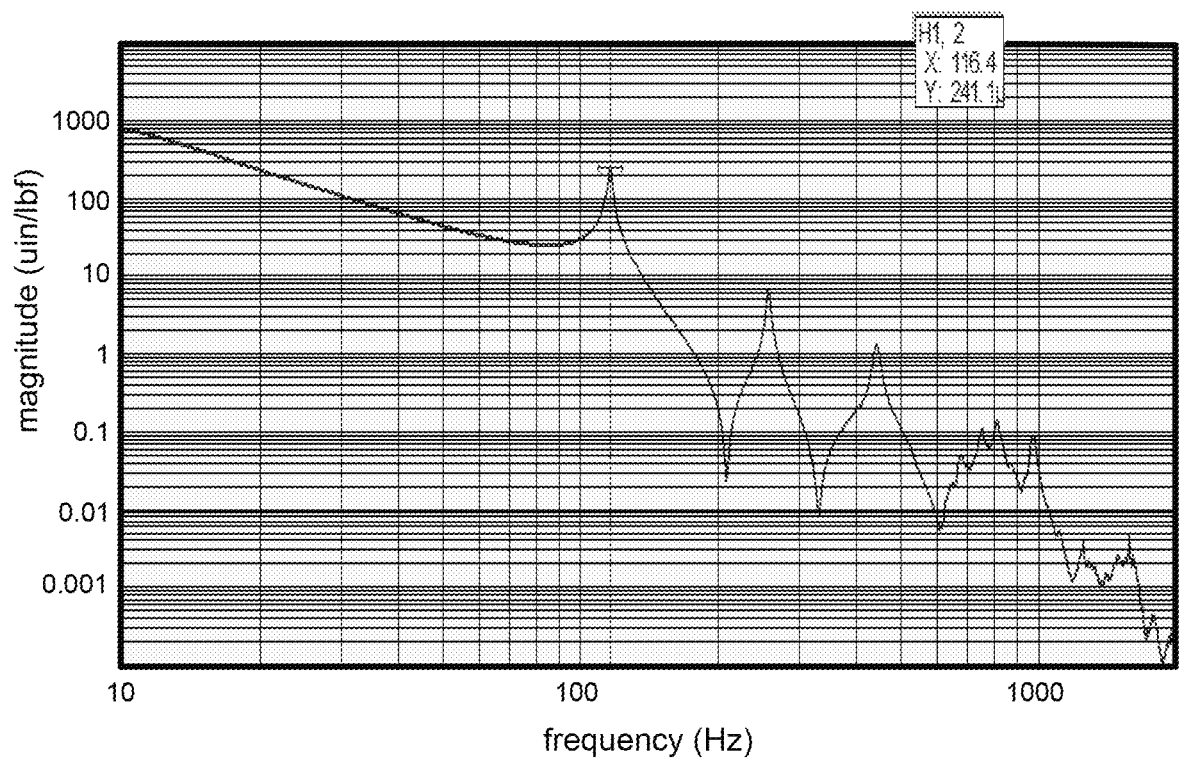
FIG. 4B illustrates vibration-damping performance of a comparable-thickness honeycomb tabletop.

For comparison, a similar test was run for a honeycomb tabletop like the structure depicted in FIG. 1A, and having a same thickness and size as the laminated, vibration-damped tabletop that produced the results of FIG. 4A. The results from the honeycomb tabletop are shown in FIG. 4B. The honeycomb tabletop shows a response of over 700 microinch per pound-foot at 10 Hz. The deflection remains higher than the laminated tabletop for frequencies up to about 130 Hz. This tabletop exhibits a first resonance peak at approximately 120 Hz having a magnitude of approximately 240 microinch per pound-foot, a value nearly three times higher than for the laminated, vibration-damped tabletop.

As can be seen from the two graphs, the laminated tabletop structure depicted in FIG. 2A exhibits superior damping characteristics below about 130 Hz. The laminated tabletop is a stiffer structure, since its first resonance peak, at about 170 Hz, is at a higher frequency and of lower amplitude than the first resonance peak of the honeycomb tabletop. The laminated tabletop exhibits lower deflection at lower frequencies. The results are worth noting, considering that the honeycomb structure is a more highly engineered steel-walled and webbed structure with a much higher Young's modulus than the medium density fiberboard.

Figure 5:
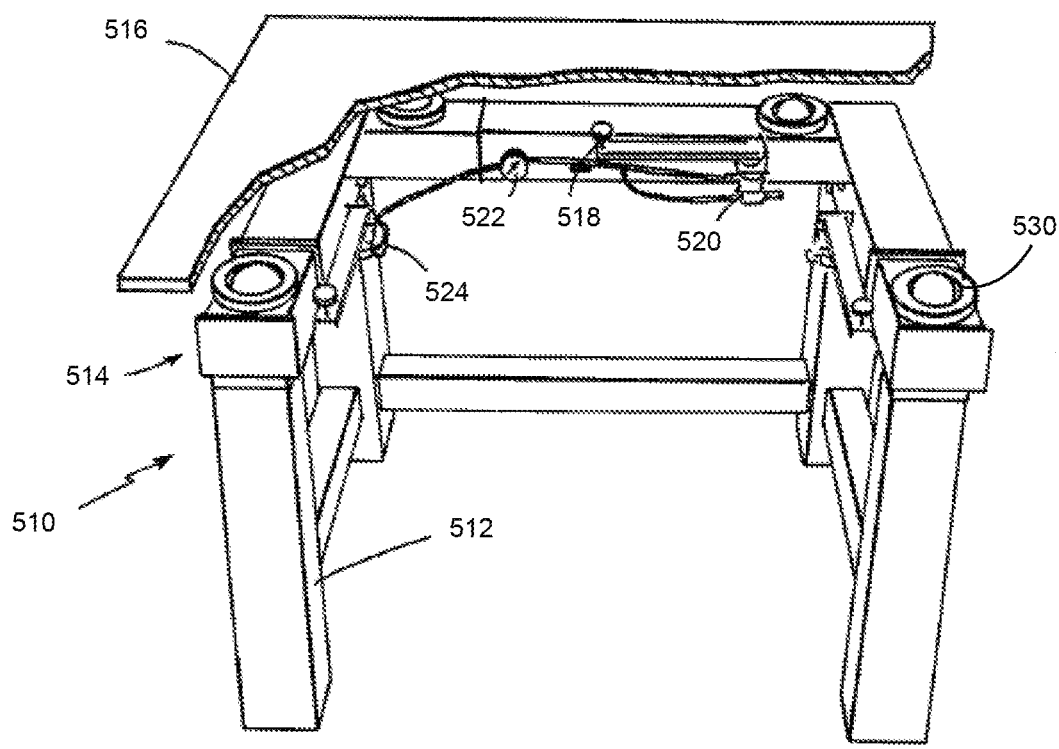
FIG. 5 depicts a vibration-damping platform configured to support a low-profile tabletop, according to some embodiments.

According to some embodiments, a low-profile, vibration-damped tabletop 516 may be supported by a vibration-isolation platform 510, as depicted in FIG. 5. The tabletop 516 may be any of the aforementioned embodiments described in connection with FIG. 2A through FIG. 3C. The vibration-isolation platform 510 may comprise passive damping, as depicted, or may comprise active damping. A passively-damped vibration-isolation platform 510 may comprise legs 512 and an air-isolation system 514. The air-isolation system 514 may be self-leveling, and include a plurality valve adjustment pads 518 that sense a location of a region of the tabletop 516 and actuate servo-valves 520 responsive to the sensed location. The platform may further include a table air gauge 522, an air inlet 524 to couple pressurized air to the isolation system from an external air supply, and four load-carrying pneumatic piston assemblies 530. The piston assemblies may be pressurized or depressurized by the servo-valves 520. Sensitive scientific equipment may be placed on the tabletop 516. The air-isolation system 514 floats the tabletop and equipment via the piston assemblies, and thereby suppresses coupling of mechanical perturbations from the floor or legs to the tabletop and equipment.

Figure 6A:
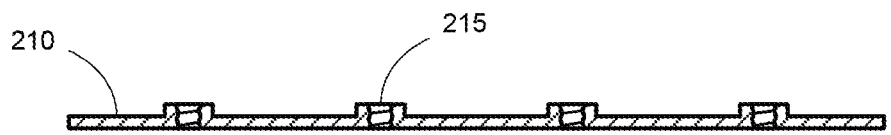
FIG. 6A through FIG. 6D depict structures associated with a method for manufacturing a low-profile, vibration-damped tabletop, according to some embodiments.
Figure 6B:
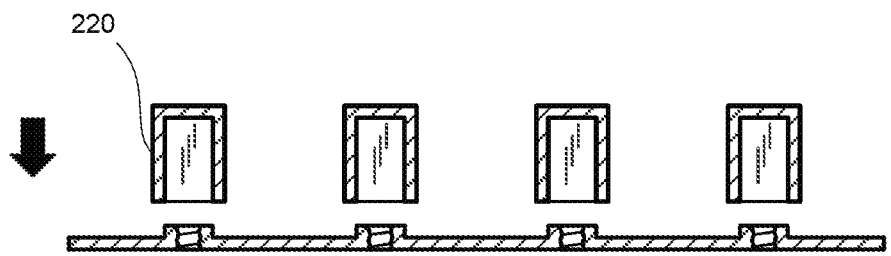

FIG. 6A through FIG. 6D depict structures associated with a method for forming a low-profile, vibration-damped tabletop, according to some embodiments. In some implementations, a laminated, low-profile tabletop may be formed by forming a plurality of threaded holes 215 in a top skin 210, as depicted in FIG. 6A. The holes may be formed by an extrusion and tapping process, according to some embodiments. In some embodiments, the holes may be formed by a drilling and tapping process or any other suitable manufacturing process. In some implementations, the holes may be formed using a laser. The top skin 210 may then be cleaned to remove machining particles, lubricants, and other debris. A plurality of cups 220 may then be adhered to the top skin 210 to back the holes, as depicted in FIG. 6B. An epoxy, or any other suitable adhesive, may be used to adhere the cups 220 to the top skin 210.

Figure 6C:
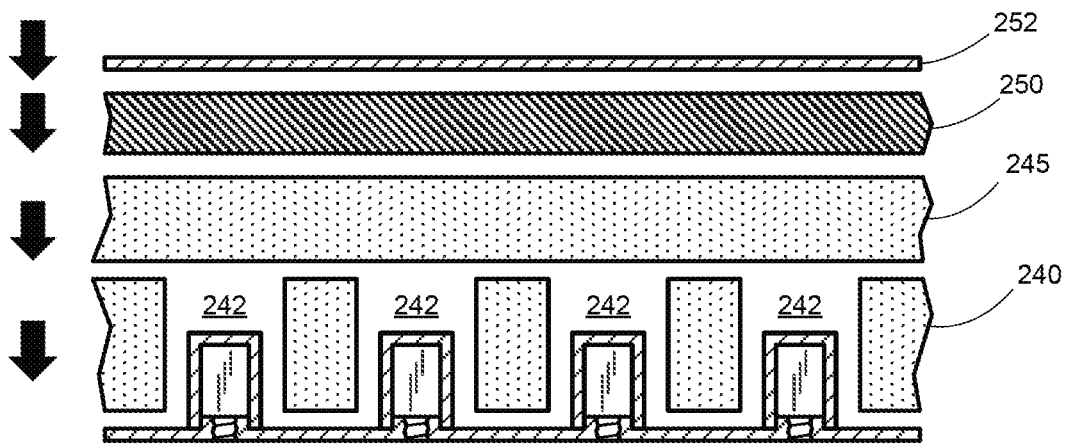

According to some embodiments, a first homogeneous material 240 may be manufactured to produce a plurality of voids 242 in the homogeneous material. The voids may be formed according to any suitable manufacturing process, e.g., milling, drilling, routing, a molding process, or forming the first homogeneous material in place. The first homogeneous material 240, a second homogeneous material 245, a base plate 250, and a bottom skin 252 may then be bonded to the top skin, as depicted in FIG. 6C. In some implementations, the homogeneous materials and base plate may be bonded to the top skin at a same time. During bonding, pressure may be applied across the tabletop so that the layers bond uniformly across the bonding surfaces. In some implementations, a flexible material may be pressed to the top skin 210 during bonding, so that the laminated layers may flex and bond uniformly to the base plate 250. Any suitable adhesive, such as an epoxy, and may be used to bond the different layers together. In some implementations, the adhesive may reflow between layers while the layers are pressed, so as to fill gaps due to the non-flatness of one or more layers. Accordingly, the layers may not need to flex, or flex only an insignificant amount, during bonding.

Figure 6D:
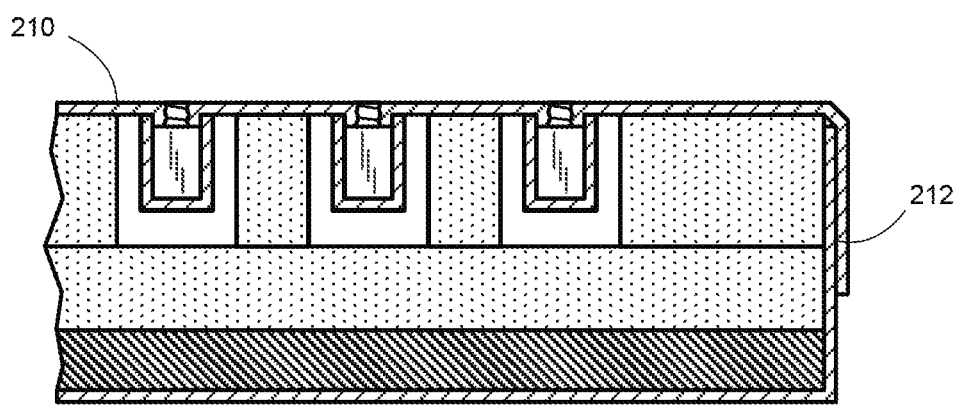

According to some embodiments walls 212 may be formed at the peripheral edges of the tabletop to seal the interior region of the tabletop. In some implementations, extensions of the top skin 210 and/or bottom skin 252 may be bent and adhered at the periphery of the tabletop forming walls 212, as depicted in FIG. 6D. In other embodiments, a separate material may be bonded to the periphery of the table. An additional advantage of the homogeneous filling material compared to the honeycomb filler is that the homogeneous material provides a uniform and solid backing for the walls 212. This improves the strength of the sidewalls, and makes it easier to seal the interior of the tabletop.

Figure 7A:
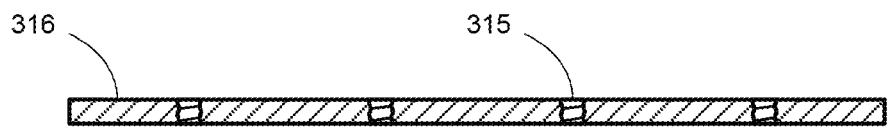
FIG. 7A through FIG. 7C depict structures associated with a method for manufacturing a low-profile, vibration-damped tabletop, according to some embodiments Features and advantages of the illustrated embodiments will become more apparent from the detailed description set forth below when taken in conjunction with the drawings.
Figure 7B:
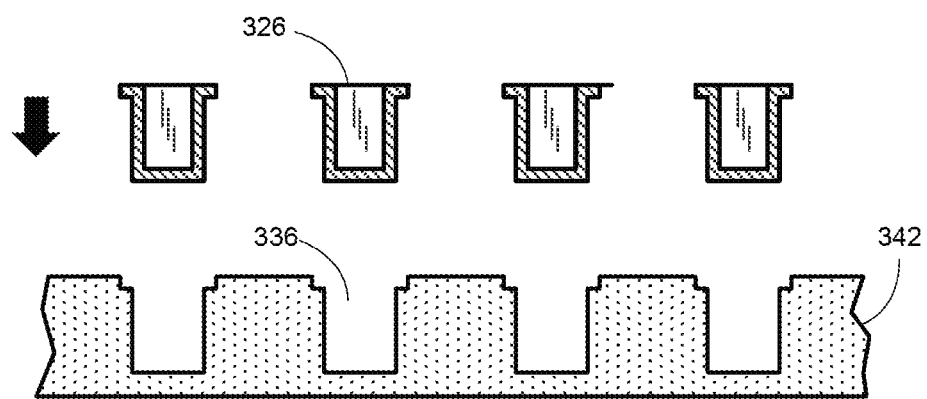
Figure 7C:
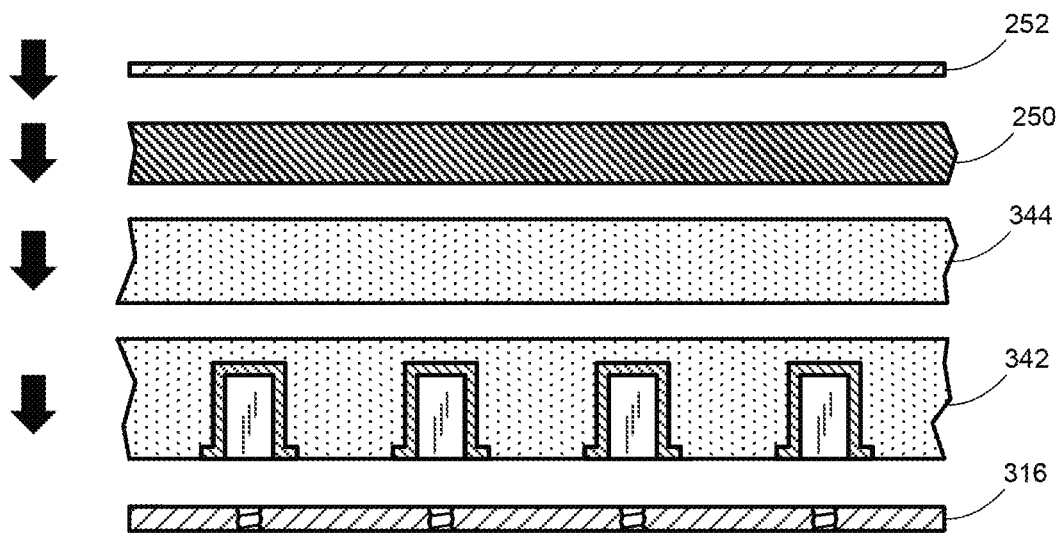

FIG. 7A through FIG. 7C depict structures associated with another method for forming a low-profile, vibration-damped tabletop, according to some embodiments. A plurality of holes 315 may be formed and threaded in a top skin 316, as depicted in FIG. 7A. A plurality of voids 336 may be formed in a first homogeneous material 342, and cups 326 may be inserted into the voids, as depicted in FIG. 7B. The layers of the tabletop may then be bonded together, as depicted in FIG. 7C. According to this process, individual cups do not need to be aligned and bonded individually to each hole in the top skin in a step that is separate from alignment and bonding of the first homogeneous material.

Various configurations of a laminated, low-profile, vibration-damped tabletop and methods of manufacture may be implemented. Some example configurations and method embodiments include, but are not limited to, the following:

(1) A vibration-damping tabletop comprising a top metallic skin perforated with a plurality of holes, a plurality of cups backing the plurality of holes and bonded to the top metallic skin, a first homogeneous filling material bonded to the top metallic skin, wherein the first homogeneous filling material comprises manufactured voids to accommodate the plurality of cups, and a base metallic plate connected to the first homogeneous filling material.

(2) The tabletop of configuration (1), wherein the first homogeneous filling material fills more than one-quarter of the volume spanned by the first homogeneous filling material.

(3) The tabletop of (1) or (2), wherein the base metallic plate is thicker than the top metallic skin and a total thickness of the tabletop is between approximately 1.5 inches and approximately 2.5 inches.

(4) The tabletop of any one of (1)-(3), wherein a thickness of the base metallic plate is dimensioned to give a weight to the tabletop of at least 150 pounds.

(5) The tabletop of (4), wherein the tabletop has the weight of at least 150 pounds for an areal size as small as 18 inches by 20 inches.

(6) The tabletop of any one of (1)-(5), wherein the plurality of cups are integrally formed in the first homogeneous filling material from the manufactured voids (7) The tabletop of any one of (1)-(6), further comprising walls at the edge of the tabletop that, with the top metallic skin, plurality of cups, and base metallic plate, seal the interior of the tabletop.

(8) The tabletop of (7), wherein the walls comprise extensions of the top metallic skin that are bent toward and connected to a periphery of the first homogeneous material.

(9) The tabletop of any one of (1)-(8), further comprising a vibration-isolation platform having multiple load-carrying supports configured to support the tabletop.

(10) The tabletop of (9), wherein a thickness of the base metallic plate is dimensioned to give a weight of at least 35 pounds on each load-carrying support.

(11) The tabletop of (9) or (10), wherein the vibration-isolation platform comprises a passive damping system.

(12) The tabletop of any one of (9)-(11), wherein a natural resonance frequency of the tabletop in a vertical direction is less than 3 Hz.

(13) The tabletop of any one of (9), (10), or (12), wherein the vibration-isolation platform comprises an active damping system.

(14) The tabletop of any one of (1)-(13), wherein the top metallic skin comprises stainless steel and a thickness of the top metallic skin is between approximately 0.048 inch and approximately 0.25 inch.

(15) The tabletop of any one of (1)-(14), wherein the plurality of holes are threaded.

(16) The tabletop of any one of (1)-(15), wherein the plurality of holes are extruded and threaded.

(17) The tabletop of any one of (1)-(16), wherein the plurality of cups are formed from a metal.

(18) The tabletop of any one of (1)-(16), wherein the plurality of cups are formed from a polymer.

(19) The tabletop of any one of (1)-(18), wherein the first homogeneous filling material comprises fiberboard.

(20) The tabletop of any one of (1)-(18), wherein the first homogeneous filling material comprises a polymeric board.

(21) The tabletop of any one of (1)-(18), wherein the first homogeneous filling material comprises metal foam.

(22) The tabletop of any one of (1)-(18), wherein the first homogeneous filling material comprises fiberglass.

(23) The tabletop of any one of (1)-(18), wherein the first homogeneous filling material comprises cast resin.

(24) The tabletop of any one of (1)-(18), wherein the first homogeneous filling material comprises wood.

(25) The tabletop of any one of (1)-(24), further comprising a second homogeneous material bonded to the first homogeneous material and the base metallic plate.

(26) A method for manufacturing a vibration-damped tabletop, the method comprising acts of forming a plurality of holes in a first metallic skin, bonding a plurality of cups to the first metallic skin to back the plurality of holes, forming a plurality of voids in a first homogeneous material, wherein a spacing of the plurality of voids matches a spacing of the plurality of holes, connecting the first homogeneous material to the first metallic skin, and connecting a metallic plate to the first homogeneous material.

(27) The method of embodiment (26), wherein connecting the metallic plate comprises bonding the metallic plate to the first homogeneous material.

(28) The method of (26) or (27), wherein connecting the metallic plate comprises bonding a second homogenous material to the first homogeneous material, and bonding the metallic plate to the second homogeneous material.

(29) The method of any one of (26)-(28), further comprising sealing an interior of the tabletop with walls at the periphery of the tabletop, wherein the walls are of a material that is different from the first homogeneous material.

(30) The method of any one of (26)-(29), wherein forming the plurality of holes comprises drilling the holes in the first metallic skin.

(31) The method of any one of (26)-(30), further comprising selecting a thickness of the metallic plate so that the tabletop has a weight of at least 150 pounds, and wherein a thickness of the tabletop is between approximately 1.5 inches and approximately 2.5 inches.

(32) A method for manufacturing a vibration-damped tabletop, the method comprising acts of forming a plurality of holes in a first metallic skin, forming a plurality of voids in a first homogeneous material, wherein a spacing of the plurality of voids matches a spacing of the plurality of holes, inserting a plurality of cups into the plurality of voids, connecting the first homogeneous material to the first metallic skin, so that the cups seal to the first metallic skin and back the plurality of holes, and connecting a metallic plate to the first homogeneous material.

(33) The method of embodiment (32) or (38), wherein connecting the metallic plate comprises bonding the metallic plate to the first homogeneous material.

(34) The method of (32), (33), or (38), wherein connecting the metallic plate comprises bonding a second homogenous material to the first homogeneous material, and bonding the metallic plate to the second homogeneous material.

(35) The method of any one of (32)-(34) or (38), further comprising sealing an interior of the tabletop with walls at the periphery of the tabletop, wherein the walls are of a material that is different from the first homogeneous material.

(36) The method of any one of (32)-(35) or (38), wherein forming the plurality of holes comprises drilling the holes in the first metallic skin.

(37) The method of any one of (32)-(36) or (38), further comprising selecting a thickness of the metallic plate so that the tabletop has a weight of at least 150 pounds, and wherein a thickness of the tabletop is between approximately 1.5 inches and approximately 2.5 inches.

(38) A method for manufacturing a vibration-damped tabletop, the method comprising acts of forming a plurality of holes in a first metallic skin, forming a plurality of cups from at least a first homogeneous material, wherein a spacing of the plurality of cups matches a spacing of the plurality of holes, connecting the first homogeneous material to the first metallic skin, so that the plurality of cups seal to the first metallic skin and back the plurality of holes, and connecting a metallic plate to the first homogeneous material.

CONCLUSION

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value. For example, a phrase "between about 10 and about 20" is intended to mean "between exactly 10 and exactly 20" in some embodiments, as well as "between 10±δ1 and 20±δ2" in some embodiments. The amount of variation δ1, δ2 for a value may be less than 5% of the value in some embodiments, less than 10% of the value in some embodiments, and yet less than 20% of the value in some embodiments. In embodiments where a large range of values is given, e.g., a range including two or more orders of magnitude, the amount of variation δ1, δ2 for a value could be as high as 50%. For example, if an operable range extends from 2 to 200, "approximately 80" may encompass values between 40 and 120 and the range may be as large as between 1 and 300. When only exact values are intended, the term "exactly" is used, e.g., "between exactly 2 and exactly 200."

The technology described herein may be embodied as a method, of which at least some acts have been described. The acts performed as part of the method may be ordered in any suitable way. Accordingly, embodiments may be constructed in which acts are performed in an order different than described, which may include performing some acts simultaneously, even though described as sequential acts in illustrative embodiments. Additionally, a method may include more acts than those described, in some embodiments, and fewer acts than those described in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

The invention claimed is:

1. A vibration-damped tabletop comprising:
   a top metallic skin perforated with a plurality of holes;
   a plurality of cups backing the plurality of holes and sealed to the top metallic skin;
   a first filling material bonded to the top metallic skin, wherein the first filling material comprises a fiberboard, polymeric board, fiberglass, or a cast resin;
   voids formed in the first filling material, wherein the plurality of cups are located in the voids; and
   a base metallic plate connected to the first filling material.

2. The tabletop of claim 1, wherein the first filling material comprises fiberboard.

3. The tabletop of claim 2, wherein the base metallic plate is thicker than the top metallic skin and a total thickness of the tabletop is between approximately 1.5 inches and approximately 2.5 inches.

4. The tabletop of claim 2, wherein a thickness of the base metallic plate is dimensioned to give a weight to the tabletop of at least 150 pounds.

5. The tabletop of claim 4, wherein the tabletop has the weight of at least 150 pounds for an areal size as small as 18 inches by 20 inches.

6. The tabletop of claim 2, wherein the plurality of cups are integrally formed in the first filling material.

7. The tabletop of claim 2, further comprising walls at the edge of the tabletop that, with the top metallic skin, plurality of cups, and base metallic plate, seal an interior of the tabletop.

8. The tabletop of claim 7, wherein the walls comprise extensions of the top metallic skin that are bent toward and connected to a periphery of the first filling material.

9. The tabletop of claim 2, further comprising a vibration-isolation platform having multiple load-carrying supports configured to support the tabletop.

10. The tabletop of claim 9, wherein a thickness of the base metallic plate is dimensioned to give a weight of at least 35 pounds on each load-carrying support.

11. The tabletop of claim 9, wherein the vibration-isolation platform comprises a passive damping system.

12. The tabletop of claim 10, wherein a natural resonance frequency of the tabletop in a vertical direction is less than 3 Hz.

13. The tabletop of claim 9, wherein the vibration-isolation platform comprises an active damping system.

14. The tabletop of claim 2, wherein the top metallic skin comprises stainless steel and a thickness of the top metallic skin is between approximately 0.048 inch and approximately 0.25 inch.

15. The tabletop of claim 2, wherein the plurality of holes are threaded.

16. The tabletop of claim 2, wherein the plurality of holes are extruded and threaded.

17. The tabletop of claim 2, wherein the plurality of cups are located in the voids and formed from a metal.

18. The tabletop of claim 2, wherein the plurality of cups are located in the voids and formed from a polymer.

19. The tabletop of claim 2, wherein the first filling material fills more than one-quarter of a volume spanned by the first filling material that includes the voids.

20. The tabletop of claim 1, wherein the first filling material comprises a polymeric board.

21. The tabletop of claim 1, wherein the first filling material comprises fiberglass.

22. The tabletop of claim 1, wherein the first filling material comprises cast resin.

23. The tabletop of claim 2, further comprising a second filling material bonded to the first filling material and to the base metallic plate.

24. The tabletop of claim 20, wherein the first filling material fills more than one-quarter of a volume spanned by the first filling material that includes the voids.

25. The tabletop of claim 20, wherein the base metallic plate is thicker than the top metallic skin and a total thickness of the tabletop is between approximately 1.5 inches and approximately 2.5 inches.

26. The tabletop of claim 20, wherein a thickness of the base metallic plate is dimensioned to give a weight to the tabletop of at least 150 pounds.

27. The tabletop of claim 20, wherein the plurality of cups are integrally formed in the first filling material.

28. The tabletop of claim 20, further comprising walls at the edge of the tabletop that, with the top metallic skin, plurality of cups, and base metallic plate, seal an interior of the tabletop.

29. The tabletop of claim 20, further comprising a vibration-isolation platform having multiple load-carrying supports configured to support the tabletop.

30. The tabletop of claim 21, wherein the first filling material fills more than one-quarter of a volume spanned by the first filling material that includes the voids.

31. The tabletop of claim 21, wherein the base metallic plate is thicker than the top metallic skin and a total thickness of the tabletop is between approximately 1.5 inches and approximately 2.5 inches.

32. The tabletop of claim 22, wherein the first filling material fills more than one-quarter of a volume spanned by the first filling material that includes the voids.

33. The tabletop of claim 22, wherein the base metallic plate is thicker than the top metallic skin and a total thickness of the tabletop is between approximately 1.5 inches and approximately 2.5 inches.

34. The tabletop of claim 22, wherein a thickness of the base metallic plate is dimensioned to give a weight to the tabletop of at least 150 pounds.

35. The tabletop of claim 22, wherein the plurality of cups are integrally formed in the first filling material.

36. The tabletop of claim 22, further comprising walls at the edge of the tabletop that, with the top metallic skin, plurality of cups, and base metallic plate, seal an interior of the tabletop.

37. The tabletop of claim 22, further comprising a vibration-isolation platform having multiple load-carrying supports configured to support the tabletop.

* * * * *